(12) United States Patent
Park et al.

(10) Patent No.: US 8,955,903 B2
(45) Date of Patent: Feb. 17, 2015

(54) ROLL BLIND FOR VEHICLES

(75) Inventors: Je-Hyeon Park, Pusan (KR); Seung-Min Yun, Pusan (KR); Eun-Bum Kim, Gyeongju-si (KR); Myung-Kwon Jang, Ulsan (KR)

(73) Assignee: Webasto Donghee Holdings Co., Ltd., Ulsan (KR)

( * ) Notice: Subject to any disclaimer, the term of this patent is extended or adjusted under 35 U.S.C. 154(b) by 11 days.

(21) Appl. No.: 13/878,005

(22) PCT Filed: Mar. 15, 2011

(86) PCT No.: PCT/KR2011/001783
§ 371 (c)(1),
(2), (4) Date: Apr. 5, 2013

(87) PCT Pub. No.: WO2012/121443
PCT Pub. Date: Sep. 13, 2012

(65) Prior Publication Data
US 2013/0187403 A1  Jul. 25, 2013

(30) Foreign Application Priority Data
Mar. 10, 2011  (KR) ........................ 10-2011-0021415

(51) Int. Cl.
*B60J 7/043* (2006.01)
*B60J 3/02* (2006.01)
*B60J 7/00* (2006.01)

(52) U.S. Cl.
CPC ..................................... *B60J 7/0015* (2013.01)
USPC ........................ 296/214; 160/245; 160/370.22

(58) Field of Classification Search
CPC ....................................................... B60J 7/0015
USPC ..................... 296/214; 160/370.22, 243, 245
See application file for complete search history.

(56) References Cited

U.S. PATENT DOCUMENTS

| | | | |
|---|---|---|---|
| 6,216,714 B1* | 4/2001 | Tucker | 135/88.01 |
| 7,000,671 B2* | 2/2006 | Biewer | 160/121.1 |
| 2002/0092630 A1* | 7/2002 | Kremer et al. | 160/370.22 |

FOREIGN PATENT DOCUMENTS

| | | |
|---|---|---|
| EP | 1145886 A1 | 10/2001 |
| EP | 2196342 A1 | 6/2010 |
| KR | 10-2007-0070078 A | 7/2007 |
| KR | 10-2008-0083593 A | 9/2008 |
| KR | 10-2009-0109955 A | 10/2009 |

* cited by examiner

*Primary Examiner* — Dennis H Pedder
(74) *Attorney, Agent, or Firm* — Sherr & Jiang, PLLC

(57) ABSTRACT

A roll blind for a vehicle, including: a guide frame formed in an inner circumference of an opening formed in a sun roof of the vehicle; a fixing shaft fixed to either of anterior and posterior areas of the vehicle on the guide frame; an opening shaft disposed on the other one of the anterior and posterior areas to which the fixing shaft is fixed; a blind disposed to selectively cover the opening according to a sliding operation of the opening shaft; and a pressing unit disposed between the fixing shaft and the opening shaft, sliding along the guide frame, rolling a central portion of the blind upward from an upper side of the blind in right and left directions of the vehicle, simultaneously wrapping two sides of the blind and simultaneously providing tension to the blind that moves from the anterior and posterior areas.

6 Claims, 4 Drawing Sheets

ROLL BLIND FOR VEHICLES

TECHNICAL FIELD

The present invention relates to a roll blind for a vehicle, and more particularly, to a roll blind for a vehicle that may prevent deflection of a blind and may reduce weight and cost of the roll blind by providing one tension pressing structure in a central portion of the roll blind.

BACKGROUND ART

Recently, a blind is installed at a glass of a vehicle so as to selectively perform sun shielding. Such a blind may be installed at a general door glass or a roof glass of a sun roof formed at a roof of the vehicle.

There are several types of blinds, and blinds can be largely classified into a blind using a roller and a fabric as a cloth for a blind and a blind that is opened/closed using a blind panel. When the double roller and the fabric are used, two methods, i.e., one thereof is to perform sun shielding by providing a roller rolling the fabric at one side of the glass and pulling the fabric toward the other side of the glass, and the other one thereof is to perform sun shielding by providing a roller rolling the fabric in the center of the glass and pulling the fabric toward both sides of the glass. In the latter case, the blind that is opened/closed using the blind panel, is called 'panorama sun roof' and is mainly used in the sun roof of the vehicle.

However, since the above-described panorama sun roof has a large area, an area to be covered is large. As a result, as the size of a roll blind increases, pressing units are disposed at both sides of the roll blind so as to effectively provide tension to the fabric with a large area. In this case, the structure of the roll blind is complicated, the weight thereof also increases, and manufacturing costs increase.

DETAILED DESCRIPTION OF THE INVENTION

Technical Problem

The present invention provides a roll blind for a vehicle, whereby deflection of a blind may be prevented and weight and costs of the roll blind may be reduced by providing one tension pressing structure in a central portion of the roll blind.

Technical Solution

According to an aspect of the present invention, there is provided a roll blind for a vehicle, including: a guide frame formed in an inner circumference of an opening formed in a sun roof of the vehicle; a fixing shaft fixed to either of anterior and posterior areas of the vehicle on the guide frame; an opening shaft disposed on the other one of the anterior and posterior areas of the vehicle to which the fixing shaft is fixed, the opening shaft sliding along the guide frame in a forward/backward direction of the vehicle; a blind, of which both ends are fixed to the opening shaft and the fixing shaft and which is disposed to selectively cover the opening according to a sliding operation of the opening shaft; and a pressing unit disposed between the fixing shaft and the opening shaft, sliding along the guide frame, rolling a central portion of the blind upward from an upper side of the blind in right and left directions of the vehicle, simultaneously wrapping two sides of the blind and simultaneously providing tension to the blind that moves from the anterior and posterior areas of the vehicle.

The pressing unit may include: a blind shaft to which tension is provided so that the central portion of the blind is rolled upward according to an opening/closing operation of the blind; a guide bracket coupled to both ends of the blind shaft and allowing the blind shaft to slide along the guide frame while interlocking with a sliding operation of the opening shaft; and a pair of guide bars disposed at a lower side of the blind shaft, connecting the guide bracket and guiding the two sides of the blind to be unfolded in the forward/backward direction of the vehicle or to be rolled upward.

The blind shaft may include a torsion spring that continuously provides stress to a direction in which the blind is rolled on the blind shaft.

The guide bracket may include: a coupling hole formed in one side of the guide bracket so that both ends of the blind shaft are inserted into the guide bracket through the coupling hole; a pair of coupling protrusions formed at a lower side of the coupling hole so that the pair of guide bars are coupled to the pair of coupling protrusions in parallel in a horizontal direction; and a guide shoe protruding from the other side of the guide bracket, inserted into and contacting the guide frame.

The roll blind for the vehicle may further include a shoe cover interposed between the guide shoe and the guide frame and reducing noise and frictional resistance.

The coupling hole may be spaced apart from a middle part of the pair of coupling protrusions by a predetermined gap to the left or right so that friction occurring when the blind enters in a space between the pair of guide bars is reduced.

EFFECT OF THE INVENTION

In a roll blind for a vehicle according to the present invention, one pressing unit is configured to open/close a blind in a forward/backward direction of the vehicle so that the structure of the roll blind for the vehicle can be simplified and the weight thereof can be reduced.

In addition, deflection of the blind can be effectively prevented, and manufacturing costs can be reduced due to the simple structure.

BEST MODE OF THE INVENTION

The present invention will now be described more fully with reference to the accompanying drawings, in which exemplary embodiments of the invention are shown.

Earlier, the terms and words used herein and in claims should not be interpreted as limited to common or dictionary senses but should be interpreted as having a meaning and a concept that are consistent with the technical spirit of the present invention, based on the principle that the inventor can properly define the concept of the terms so as to describe his/her own invention in the best manner.

Figure 1:
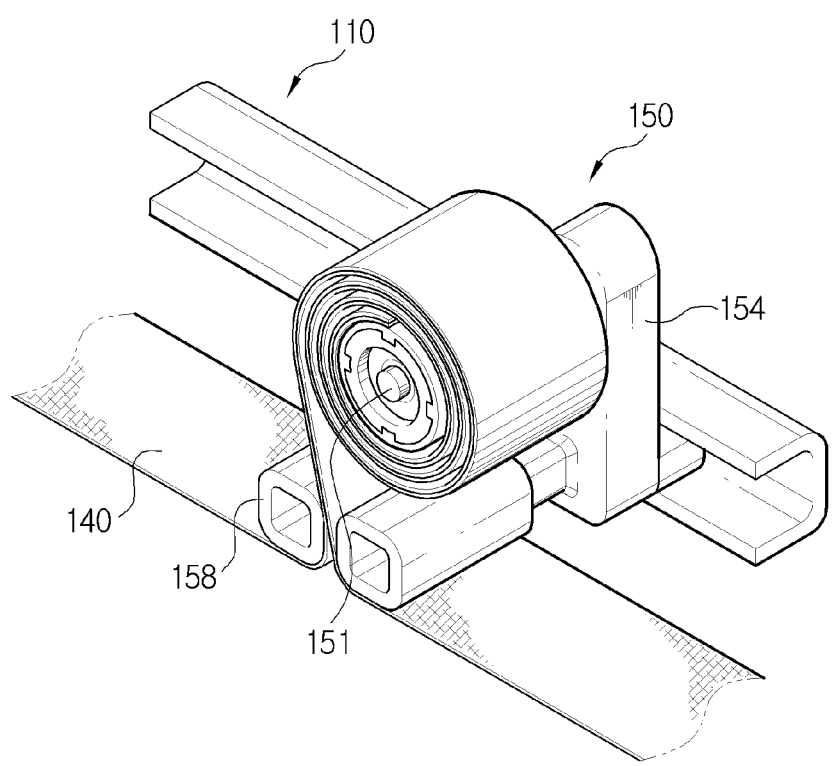
FIG. 1 is a perspective view of a roll blind for a vehicle according to an embodiment of the present invention.
Figure 2:
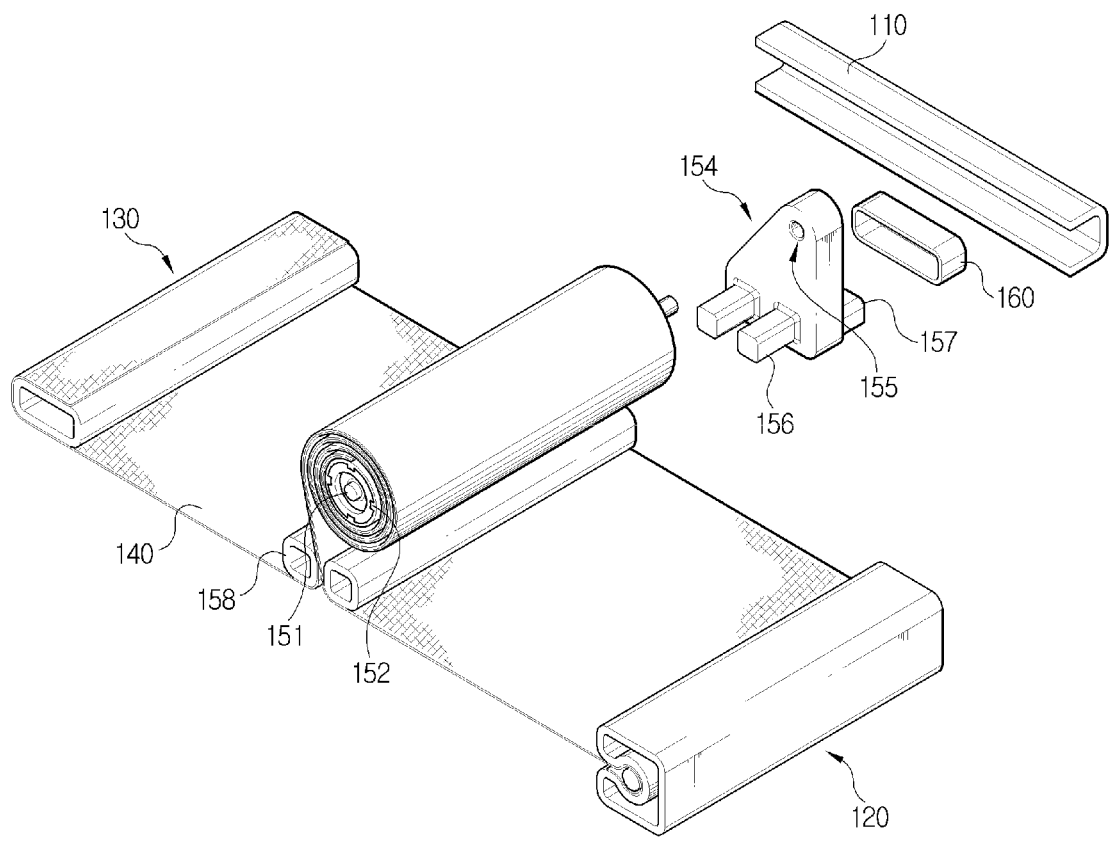
FIG. 2 is an exploded perspective view of the roll blind for the vehicle illustrated in FIG. 1.

FIG. 1 is a perspective view of a roll blind for a vehicle 100 according to an embodiment of the present invention, and FIG. 2 is an exploded perspective view of the roll blind for the vehicle 100 illustrated in FIG. 1.

Referring to FIGS. 1 and 2, the roll blind for the vehicle 100 includes a guide frame 110 disposed at a lower side of a sun roof 10 of the vehicle, a fixing shaft 120 fixed to either of anterior and posterior areas of the vehicle on the guide frame 110, an opening shaft 130 disposed on the other one of the anterior and posterior areas of the vehicle to which the fixing shaft 120 is fixed, a blind 140 disposed such that the sun roof 10 can be selectively covered according to an operation of the opening shaft 130, and a pressing unit 150 providing tension to the blind 140.

The guide frame 110 is formed in an inner circumference of an opening 11 formed in the sun roof 10 formed at a roof of the vehicle. Here, the guide frame 110 may be formed in a rail form in right and left directions of the vehicle in the inner circumference of the opening 11 so that the opening shaft 130 and the pressing unit 150 may slide along the guide frame 110.

The fixing shaft 120 may be fixed to either of the anterior and posterior areas of the vehicle on the guide frame 110 so that a user may selectively fix the fixing shaft 120 to either of the anterior and posterior areas of the vehicle. Thus, a position where the fixing shaft 120 is fixed, may be changed.

The opening shaft 130 is disposed on the other one of the anterior and posterior areas of the vehicle to which the fixing shaft 120 is fixed. In this case, the opening shaft 130 is disposed to close the blind 140. When the opening shaft 130 slides in a direction of the fixing shaft 120 while interlocking with the pressing unit 150, the opening shaft 130 operates to open the blind 140.

The opening shaft 130 is disposed in an opposite direction to a direction in which the fixing shaft 120 is disposed. Thus, the position of the opening shaft 130 may be changed.

The blind 140 serves to open/close the opening 11 when the blind 140 is unfolded on the guide frame 110 or is rolled upward and two sides of the blind 140 are simultaneously wrapped by the pressing unit 150. One end of the blind 140 is fixed to the fixing shaft 120, and the other end thereof is fixed to the opening shaft 130. As the opening shaft 130 slides along the guide frame 110, the blind 140 is discharged from the pressing unit 150 or is rolled by the pressing unit 150.

The pressing unit 150 includes a blind shaft 151 that rolls portions of the blind 140 and provides tension to the blind 140, a guide bracket 154 coupled to both ends of the blind shaft 151, and a pair of guide bars 158 that are disposed at a lower side of the blind shaft 151 and connect the guide bracket 154.

The blind shaft 151 is disposed at an upper side of the guide frame 110, is long formed in a rod form in right and left directions of the vehicle and serves to roll or unroll the blind 140 in an upper direction of the pair of guide bars 158. In this case, a torsion spring 152 is provided on the blind shaft 151 so that tension may be provided from the guide bracket 154 to a direction in which the blind 140 is rolled on the blind shaft 151.

Thus, the torsion spring 152 allows the blind 140 to be rolled upward on the outer circumference of the blind shaft 151 using the tension when the blind 140 is rolled up and prevents the blind 140 from being deflected downward from the center of the opening shaft 130 and the fixing shaft 120 when the blind 140 is unfolded on the opening 11.

The pair of guide bars 158 are disposed spaced apart from each other by a predetermined gap so that the blind 140 may enter in a space between the guide bars 158. Thus, the blind 140 is unfolded from the lower side of each of the facing guide bars 158 to the anterior and posterior areas of the vehicle, or two sides of the blind 140 are simultaneously rolled upward with the gap.

The guide bracket 154 has a cross-section that is an approximately right isosceles triangular form, a coupling hole 155 is formed in an inner side of the guide bracket 154 so that the central axis of the blind shaft 151 is inserted into the guide bracket 154 through the coupling hole 155, a pair of coupling protrusions 156 are formed at a lower side of the coupling hole 155 so that the guide bars 158 may be coupled to the pair of coupling protrusions 156 in parallel in a horizontal direction, and a guide shoe 157 protrudes from an outer side of the guide bracket 154 so that the guide shoe 157 may be coupled to the guide frame 110 and may slide.

The pair of coupling protrusions 156 are disposed in parallel in the horizontal direction and are spaced apart from each other by a gap corresponding to the gap of the pair of the guide bars 168.

The coupling hole 155 is disposed in the upward direction of one coupling protrusion 156 in consideration of the diameter of the blind shaft 151 and a thickness at which the blind 140 is rolled on the blind shaft 151. This is because the blind 140 is not rolled or unrolled on or from the center of the blind shaft 151 but is rolled or unrolled on or from the circumferential direction of the blind shaft 151 so that friction is reduced when the blind 140 enters in the space between the guide bars 158 and the blind 140 may be prevented from being damaged by this friction.

A shoe cover 160 is interposed between the guide shoe 157 and the guide frame 110.

The shoe cover 160 serves to reduce friction between the guide shoe 157 and the guide frame 110 and to prevent the occurrence of noise.

Hereinafter, a method of operating the roll blind for the vehicle 100 according to the present invention will be described with the accompanying drawings.

Figure 3:
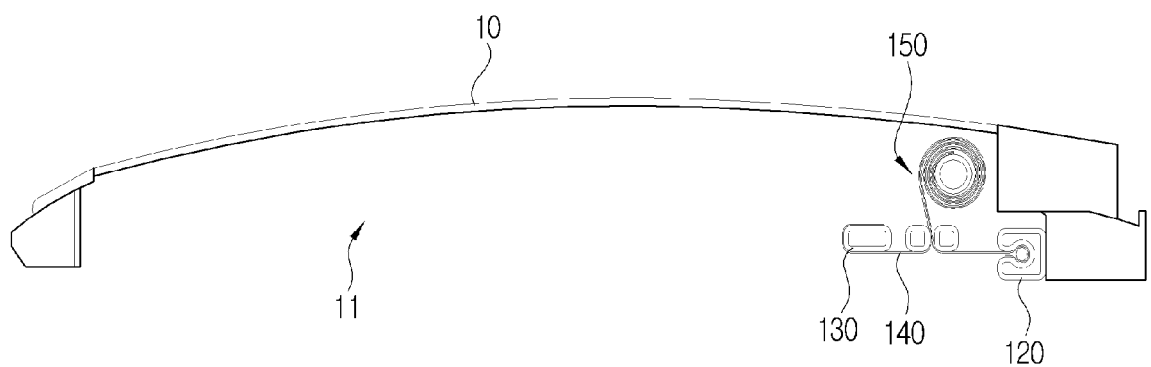
FIGS. 3 through 5 are cross-sectional views in a latitudinal direction illustrating a state in which the roll blind for the vehicle of FIG. 1 operates.
Figure 4:
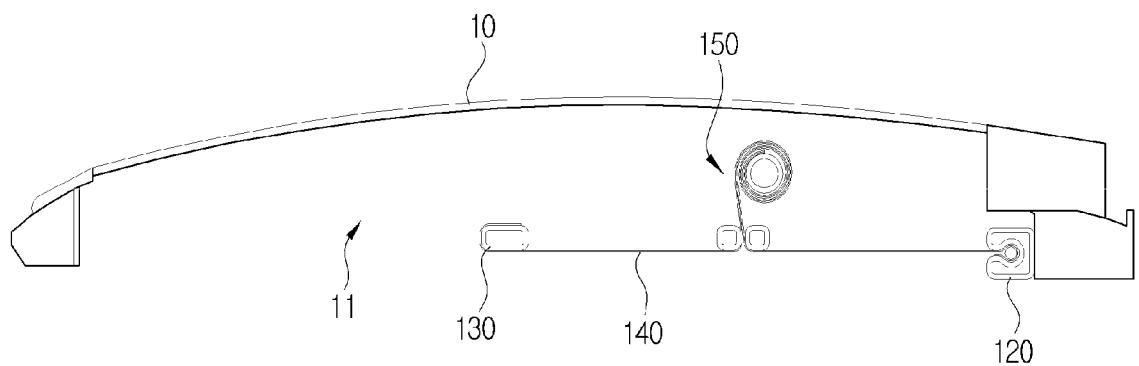
Figure 5:
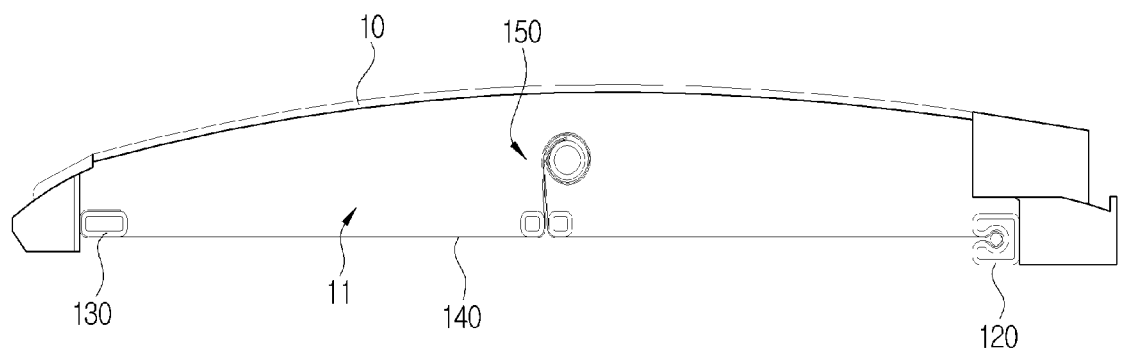

FIG. 3 is a cross-sectional view in a latitudinal direction illustrating a state in which the roll blind for the vehicle 100 illustrated in FIG. 1 is fully opened, FIG. 4 is a cross-sectional view in a latitudinal direction illustrating a state in which the roll blind for the vehicle 100 illustrated in FIG. 3 is half opened, and FIG. 5 is a cross-sectional view in a latitudinal direction illustrating a state in which the roll blind for the vehicle 100 illustrated in FIG. 3 is fully closed.

The roll blind for the vehicle 100 illustrates an example in which the fixing shaft 120 is fixed to the posterior area of the vehicle.

The opening shaft 130 and the pressing unit 150 are disposed adjacent to the fixing shaft 120. In this case, the whole blind 140 is rolled on the blind shaft 151 so that the roll blind 100 for the vehicle is fully opened and indoor openness of the vehicle is secured through the opening 11.

When about 50% of the opening shaft 130 slides forward, about 25% of the pressing unit 150 moves forward. Then, the blind 140 is unrolled from the blind shaft 151 and is unfolded based on the guide bars 158 so that about 50% of the opening 11 may be covered in a forward/backward direction of the vehicle.

Here, if the opening shaft 130 fully slides toward the anterior area of the vehicle, the pressing unit 150 is positioned in the middle part of the opening 11, and the blind 140 is further unrolled from the blind shaft 151 and is disposed to cover the whole opening 11.

The opening shaft 130 may be driven in a manual mode or an automatic mode using a driving source. In the manual mode, the user makes a sliding operation of the opening shaft 130 by hand so as to dispose the opening shaft 130 in a setting position according to a desired amount of openness. Also, in the automatic mode, both ends of the opening shaft 130 may be driven in an open or closed direction using a wire (not shown) of the driving source.

In this case, the roll blind for the vehicle 100 may cover portions of the opening 11 or the whole opening 11 using one pressing unit 150 and may prevent deflection of the blind 140 by providing tension to the blind 140 based on the guide bars 158 in the forward/backward direction of the vehicle. As a result, the structure of the roll blind for the vehicle 100 can be simplified, the weight thereof can be reduced and manufacturing costs can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

In a roll blind for a vehicle according to the present invention, one pressing unit is configured to open/close a blind in a forward/backward direction of the vehicle so that the structure of the roll blind for the vehicle can be simplified, the weight thereof can be reduced and the roll blind for the vehicle can be installed at and applied to various sun roofs of the vehicle.

The invention claimed is:

1. A roll blind for a vehicle, comprising:
   a guide frame formed in an inner circumference of an opening formed in a sun roof of the vehicle;
   a fixing shaft fixed to either of anterior and posterior areas of the vehicle on the guide frame;
   an opening shaft disposed on the other one of the anterior and posterior areas of the vehicle to which the fixing shaft is fixed, the opening shaft sliding along the guide frame in a forward/backward direction of the vehicle;
   a blind, of which both ends are fixed to the opening shaft and the fixing shaft and which is disposed to selectively cover the opening according to a sliding operation of the opening shaft; and
   a pressing unit disposed between the fixing shaft and the opening shaft, sliding along the guide frame, rolling a central portion of the blind upward from an upper side of the blind in right and left directions of the vehicle, simultaneously wrapping two sides of the blind and simultaneously providing tension to the blind that moves from the anterior and posterior areas of the vehicle,
   wherein the pressing unit comprises:
   a blind shaft to which tension is provided so that the central portion of the blind is rolled upward according to an opening/closing operation of the blind;
   a guide bracket coupled to both ends of the blind shaft and allowing the blind shaft to slide along the guide frame while interlocking with a sliding operation of the opening shaft; and
   a pair of guide bars disposed at a lower side of the blind shaft, connecting the guide bracket and guiding the two sides of the blind to be unfolded in the forward/backward direction of the vehicle or to be rolled upward.

2. The roll blind of claim 1, wherein the blind shaft comprises a torsion spring that continuously provides stress to a direction in which the blind is rolled on the blind shaft.

3. The roll blind of claim 1, wherein the guide bracket comprises:

a coupling hole formed in one side of the guide bracket so that both ends of the blind shaft are inserted into the guide bracket through the coupling hole;
a pair of coupling protrusions formed at a lower side of the coupling hole so that the pair of guide bars are coupled to the pair of coupling protrusions in parallel in a horizontal direction; and
a guide shoe protruding from the other side of the guide bracket, inserted into and contacting the guide frame.

4. The roll blind of claim 3, further comprising a shoe cover interposed
between the guide shoe and the guide frame and reducing noise and frictional resistance.

5. The roll blind of claim 3, wherein the coupling hole is spaced apart from a
middle part of the pair of coupling protrusions by a predetermined gap to the left or right so that friction occurring when the blind enters in a space between the pair of guide bars is reduced.

6. A roll blind for a vehicle, comprising:
   a guide frame formed in an inner circumference of an opening formed in a sun roof of the vehicle;
   a fixing shaft fixed to either of anterior and posterior areas of the vehicle on the guide frame;
   an opening shaft disposed on the other one of the anterior and posterior areas of the vehicle to which the fixing shaft is fixed, the opening shaft sliding along the guide frame in a forward/backward direction of the vehicle;
   a blind, of which both ends are fixed to the opening shaft and the fixing shaft and which is disposed to selectively cover the opening according to a sliding operation of the opening shaft; and
   a pressing unit disposed between the fixing shaft and the opening shaft, sliding along the guide frame, rolling a central portion of the blind upward from an upper side of the blind in right and left directions of the vehicle, simultaneously wrapping two sides of the blind and simultaneously providing tension to the blind that moves from the anterior and posterior areas of the vehicle,
   wherein the pressing unit comprises:
   a blind shaft to which tension is provided so that the central portion of the blind is rolled upward according to an opening/closing operation of the blind;
   a pair of guide bars in a hollow form;
   a guide bracket coupled to both ends of the blind shaft and allowing the blind shaft to slide along the guide frame while interlocking with a sliding operation of the opening shaft, the guide bracket comprising a coupling hole formed in one side of the guide bracket so that both ends of the blind shaft are inserted into the guide bracket through the coupling hole, a pair of coupling protrusions formed at a lower side of the coupling hole so that the pair of guide bars are coupled to the pair of coupling protrusions in parallel in a horizontal direction, and a guide shoe protruding from the other side of the guide bracket, inserted into and contacting the guide frame; and
   wherein the pair of guide bars is disposed at a lower side of the blind shaft, connects the guide bracket and guides the two sides of the blind to be unfolded in the forward/backward direction of the vehicle or to be rolled upward, and
   the roll blind for the vehicle further comprises a shoe cover interposed between the guide shoe and the guide frame and reducing noise and frictional resistance.

* * * * *